US006759167B2

(12) United States Patent
Bowden et al.

(10) Patent No.: US 6,759,167 B2
(45) Date of Patent: Jul. 6, 2004

(54) PRIMARY LITHIUM ELECTROCHEMICAL CELL

(75) Inventors: William L. Bowden, Nashua, NH (US); Klaus Brandt, Wellesley, MA (US); Paul A. Christian, Norton, MA (US); Zhiping Jiang, Westford, MA (US)

(73) Assignee: The Gillette Company, Boston, MA (US)

( * ) Notice: Subject to any disclaimer, the term of this patent is extended or adjusted under 35 U.S.C. 154(b) by 238 days.

(21) Appl. No.: 09/988,298

(22) Filed: Nov. 19, 2001

(65) Prior Publication Data

US 2003/0118906 A1 Jun. 26, 2003

(51) Int. Cl.$^7$ ............................................. H01M 4/50
(52) U.S. Cl. ................................. 429/224; 429/231.95
(58) Field of Search ........................... 429/224, 231.95; 423/599

(56) References Cited

U.S. PATENT DOCUMENTS

| | | | |
|---|---|---|---|
| 4,133,856 A | 1/1979 | Ikeda et al. | |
| 4,246,253 A | 1/1981 | Hunter | |
| 4,312,930 A | 1/1982 | Hunter | |
| 4,604,336 A | 8/1986 | Nardi | |
| 4,904,552 A | 2/1990 | Furukawa et al. | |
| 4,975,346 A | 12/1990 | Lecerf et al. | |
| 5,114,804 A | 5/1992 | Stiles et al. | |
| 5,294,499 A | * 3/1994 | Furukawa et al. | 429/164 |
| 5,425,932 A | 6/1995 | Tarascon | |
| 5,759,510 A | 6/1998 | Pillai | |
| 5,955,052 A | 9/1999 | Padhi et al. | |
| 5,997,839 A | 12/1999 | Pillai | |
| 6,207,129 B1 | 3/2001 | Padhi et al. | |

OTHER PUBLICATIONS

Ammundsen et al., "Mechanism of Proton Insertions and Characterization of the Proton Sites in Lithium Manganate Spinels," Chem. Mater., vol. 7, No. 11, pp. 2151–2160, (1995).
Bowden et al., "Manganese Dioxide for Alkaline Zinc Batteries: Why Electrolytic $MnO_2$?," ITE Letters on Batteries, New Tecnologies & Medicien, vol. 1, No. 6, (200).
Dahn et al., "Thermal stability of $Li_xCoO_2$, $Li_xNiO_2$ and $\lambda$–$MnO_2$ and consequences for the safety of Li–ion cells," Solid State Ionics, vol. 69, Nos. 3–4, pp. 265–270, (1994).
David et al., "Structure Refinement of the Spinel–Related Phases $Li_2Mn_2O_4$ and $Li_{0.2}Mn_2O_4$," J. Solid State Chem., vol. 67, pp. 316–323, (1987).
Geronov et al., "Rechargeable Compact Li Cells with $Li_xCr_{0.9}V_{0.1}S_2$ and $Li_{1+x}V_3O_8$ Cathodes and Ether–Based Electrolytes," J. of the Electrochemical Soc., vol. 137, No. 11, pp. 3338–334, (1990).

Giwa et al., "Lithium Primary Envelope Cells," 16$^{th}$ Intern. Seminar & Exhibition on Primary & Secondary Batteries, pp. Q1–11 (1999).
Hunter, J. C. and Tudron, F. B., "Nonaqueous Electrochemistry of Lambda $MnO_2$," proc. Electrochem. Soc. vol. 85–4, pp. 444–451, (1985).
Hunter, James C., "Preparation of a New Crystal of manganese Dioxide: $\lambda$–$MnO_2$," Journal of Solid State Chemistry, vol. 39, pp. 142–147, (1981).
Larcher et al., "Synthesis of $MnO_2$ Phases from $LiMn_2O_4$ in Aqueous Acidic Media," J. Electrochem. Soc., vol. 145, No. 10, pp. 3392–3400, (1998).
Manev, V. et al., "Rechargeable lithium battery with spinel–related $\lambda$–$MnO_2$ 1. Synthesis of $\lambda$–$MnO_2$ for battery applications," Journal of Power Sources, 43–44, p. 551–559, (1993).
Mosbah et al., "Phases $Li_xMnO_2\lambda$ Rattachees au Type Spinelle," with English abstract, Bater. Res. Bull, vol. 18, pp. 1375–1381, (1938).
Patrice et al., "Understanding the second electron discharge plateau in $MnO_2$–based alkaline cells," ITE Letters on batteries, New Technologies and Medicine, vol. 2, No. 4, (2001).
Read et al., "Low Temperature Performance of $\lambda$–$MnO_2$ in Lithium Primary Batteries," Solid State Letters, vol. 4, No. 10, p. A162–165, (2001).
Schilling et al., "Modification of the High–Rate Discharge Behavior of Zn–$MnO_2$ Alkaline Cells through the Addition of Metal Oxides to the Cathode," ITE Letters on Batteries, New Technologies & Medicine, vol. 2, No. 3, (2001).
Tarascon et al., "Chemical and electrochemical instertion of Na into the spinel $\lambda$–$MnO_2$ phase," Solid State Ionics, vol. 57, pp. 113–120, (1992).
Tarason et al., "The Spinal Phase of $LiMn_2O_4$ as a Cathode in Secondary Lithium Cells," Electrochem. Soc., vol. 138, No. 10, pp. 2859–2864, (1991).
Tarason, J. M. and Guyomard, D., "The $Li_{1+x}Mn_2O_4$/C Rocking–Chair System: A Review," J. Electrochimica Acta, vol. 38, No. 9, pp. 1221–1231, (1991).
Xia, Xi and Sun Weiwei, "The electrochemical performacne of .lambda.–$MnO2$ in alkaline solution," abstract only, Dianyuan Jishu, 23 (Suppl), pp. 74–76, (1999).

* cited by examiner

*Primary Examiner*—Laura Weiner
(74) *Attorney, Agent, or Firm*—Fish & Richardson P.C.

(57) ABSTRACT

A primary electrochemical cell includes a cathode including lambda-manganese dioxide ($\gamma$-$MnO_2$), an anode including lithium or a lithium alloy, a separator interposed between the cathode and the anode, and a non-aqueous electrolyte contacting the anode and the cathode.

10 Claims, 6 Drawing Sheets

PRIMARY LITHIUM ELECTROCHEMICAL CELL

TECHNICAL FIELD

This invention relates to a primary lithium electrochemical cell and a method of manufacturing a primary lithium electrochemical cell.

BACKGROUND

A battery includes one or more galvanic cells (i.e., cells that produce a direct current of electricity) in a finished package. Cells of this type generally contain two electrodes separated by a medium capable of transporting ions, called an electrolyte. Typical electrolytes include liquid organic electrolytes or a polymeric electrolytes. The cell produces electricity from chemical reactions through oxidation at one electrode, commonly referred to as the negative electrode or anode, and reduction at the other electrode, commonly referred to as the positive electrode or cathode. Completion of an electrically conducting circuit including the negative and positive electrodes allows ion transport across the cell and discharges the battery. A primary battery is intended to be discharged to exhaustion once, and then discarded. A rechargable battery can be discharged and recharged multiple times.

An example of a primary battery is a primary lithium cell. A lithium electrochemical cell is a galvanic cell using lithium, a lithium alloy or other lithium containing materials as one electrode in the cell. The other electrode of the cell can include, for example, a transition metal oxide, such as gamma-manganese dioxide (γ-manganese dioxide or γ-$MnO_2$) or transition metal sulfide such as iron disulfide. The metal oxide or sulfide used in the electrode can be processed prior to use in a lithium battery. Generally, γ-manganese dioxide can be prepared by chemical methods or electrochemical methods. The resulting materials are known as chemically produced γ-manganese dioxide (CMD) and electrochemically produced (e.g., electrolytic or electrodeposited) γ-manganese dioxide (EMD), respectively.

SUMMARY

A primary electrochemical cell includes a cathode including lambda-manganese dioxide (γ-$MnO_2$) having a spinel-related crystal structure. The anode can include lithium metal or a lithium alloy, such as lithium aluminum alloy.

In one aspect, a primary lithium electrochemical cell includes a cathode including lambda-manganese dioxide, an anode including lithium, a separator between the anode and the cathode, and an electrolyte contacting the cathode, the anode and the separator. The cell has an average closed circuit voltage (CCV) between 3.8 and 4.1V and a specific discharge capacity to a 3V cutoff of greater than about 130 mAh/g at a nominal discharge rate of 1 mA/cm$^2$. The cell can have a 3V cutoff of greater than 135 mAh/g or 140 mAh/g or greater at a nominal discharge rate of 0.4 mA/cm$^2$.

The lambda-manganese dioxide can be heated to a temperature of less than 150° C., or 120° C. or less, during processing and cathode fabrication.

In another aspect, a method of preparing lambda-manganese dioxide includes contacting water with a compound having the general formula $Li_{1+x}Mn_{2-x}O_4$, wherein x is from −0.02 to +0.02, or −0.005 to +0.005, adding an acid to the mixture of water and the compound until the water has a pH of 1 or less, preferably between 0.5 and 1, separating a solid product from the water and acid, and drying the solid at a temperature of 150° C. or less to obtain the lambda-manganese dioxide. The method can include washing the solid separated from the water and acid with water until the washings have a pH of between 6 and 7.

The compound can have a BET surface area of between 1 and 10 m$^2$/g, or greater than 4 m$^2$/g or greater than 8 m$^2$/g, a total pore volume of between 0.02 and 0.2, or 0.05 and 0.15, cubic centimeters per gram, or an average pore size of between 100 and 300 Å.

The solid can be dried at a temperature between 20° C. and 120° C., 30° C. and 90° C., or between 50° C. and 70° C. A vacuum optionally can be applied during drying.

Contacting water and the compound includes forming a slurry. The slurry can be maintained at a temperature below 50° C. or between about 10° C. and 50° C., or about 15° C. to 30° C. The acid can be sulfuric acid, nitric acid, perchloric acid, hydrochloric acid, toluenesulfonic acid or trifluoromethylsulfonic acid. The acid solution can have a concentration between 1 and 8 molar. The temperature of the slurry can be held substantially constant during the addition of the acid.

In another aspect, a method of manufacturing a primary electrochemical cell includes providing a positive electrode including lambda-manganese oxide and forming a cell including the positive electrode and a negative electrode including lithium. The cell has a closed circuit voltage between 3.8V and 4.1V and a specific discharge capacity to a 3V cutoff of greater than about 130 mAh/g at a nominal discharge rate of 1 mA/cm$^2$. Providing the electrode can include preparing lambda-manganese dioxide by a method including contacting water with a compound of the formula $Li_{1+x}Mn_{2-x}O_4$, wherein x is from −0.02 to +0.02, adding an acid to the water and compound until the water has a pH of 1 or less, separating a solid from the water and acid, and drying the solid at a temperature of 150° C. or below to obtain the lambda-manganese dioxide. The electrode can be fabricated by mixing the lambda-manganese dioxide with a conductive additive and an optional binder.

A primary lithium electrochemical cell including a cathode containing γ-$MnO_2$ can have an average closed circuit voltage of between 3.8V and 4.1V, a specific discharge capacity to a 3V cutoff of greater than 135 mAh/g at a discharge rate of 1 mA/cm$^2$, good high-rate performance, and adequate capacity retention when stored. A closed circuit voltage of about 4V can provide desirable voltage compatibility with lithium-ion secondary cells having cathodes containing $LiCoO_2$, $LiNiO_2$ or solid solutions thereof (i.e. $LiCo_xNi_{1-x}O_2$, wherein 0<x<1). A specific single cycle capacity of greater than 135 mAh/g can provide greater capacity than the average single cycle capacity for a typical lithium-ion secondary cell having a cathode containing $LiCoO_2$, $LiNiO_2$ or solid solutions thereof. Adequate capacity retention when stored can be especially important because in a primary electrochemical cell any loss of capacity cannot be recovered through recharging. A primary lithium electrochemical cell having a cathode including γ-$MnO_2$ can have a higher total energy density than a primary lithium electrochemical cell having a cathode including heat-treated γ/β-$MnO_2$ and having an average closed circuit voltage of about 2.8V.

The physical and chemical properties of a lithium manganese oxide spinel powder ($LiMn_2O_4$) used as a precursor for the γ-$MnO_2$, especially the chemical stoichiometry and the particle microstructure, can dramatically influence the 4V discharge capacity and the thermal stability of the resulting γ-MnO$_2$ product. A high-capacity γ-MnO$_2$ can be produced by substantially completely removing of lithium from the spinel lattice of a nominally stoichiometric precursor spinel, for example, by treating the spinel with acid to a pH value of less than 2. By avoiding heat treatment of the γ-MnO$_2$ powder above 150° C., for example in the range of 80° C. to 120° C., decomposition of the γ-MnO$_2$ can be reduced or avoided, leading to a specific capacity for a low-rate discharge of greater than 130 mAh/g to a 3V cutoff, but less than the theoretical 4V capacity of about 154 mAh/g.

Other features and advantages of the invention will be apparent from the description of the preferred embodiments and from the claims.

DETAILED DESCRIPTION

Figure 1:
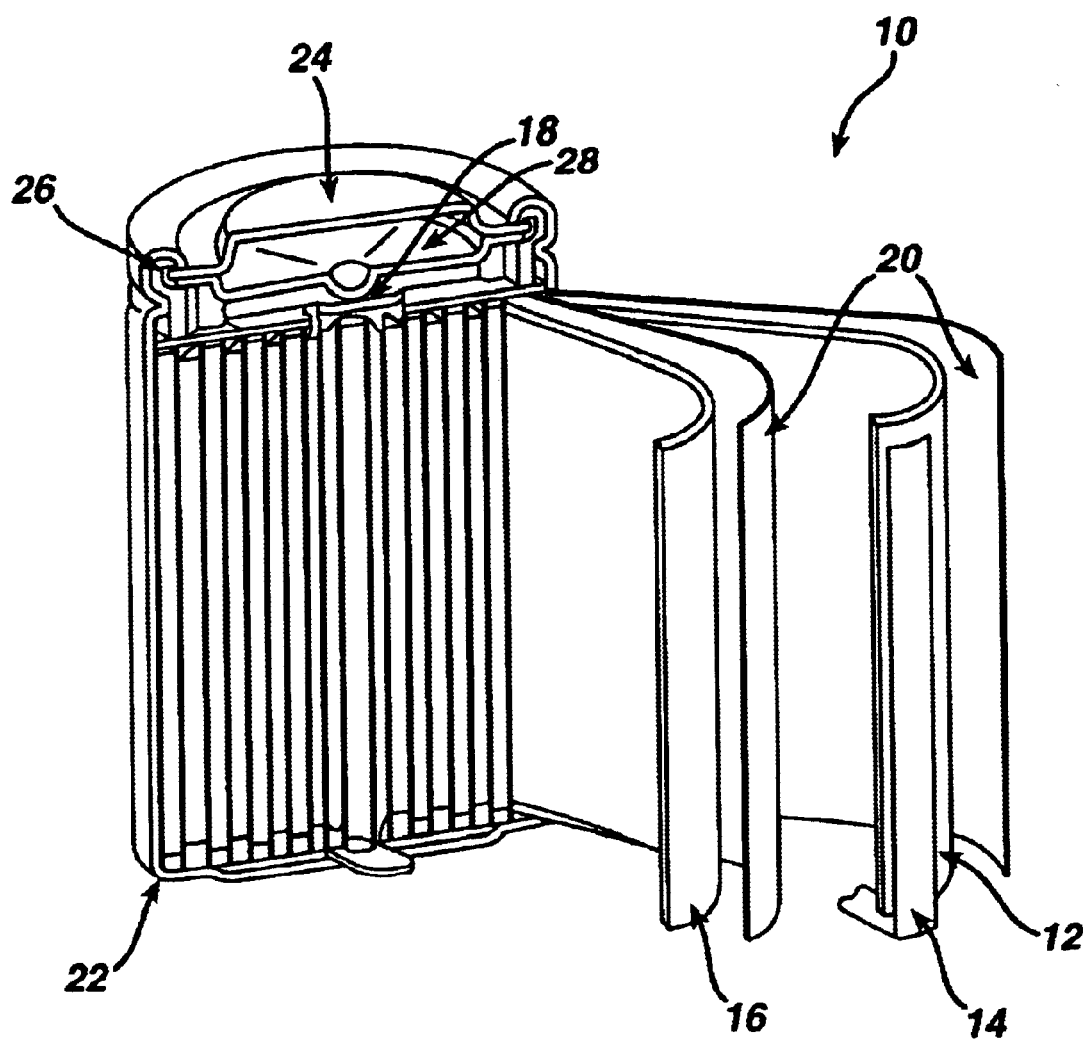
FIG. 1 is a cross-section view of a wound lithium primary electrochemical cell.

Referring to FIG. 1, a lithium primary electrochemical cell 10 that includes anode 12 in electrical contact with a negative lead 14, a cathode 16 in electrical contact with a positive lead 18, a separator 20 and an electrolyte solution. Anode 12, cathode 16, separator 20 and the electrolyte solution are contained within housing 22. The electrolyte solution includes a solvent system and a salt that is at least partially dissolved in the solvent system. One end of housing 22 is closed with a cap 24 and an annular insulating gasket 26 that can provide a gas-tight and fluid-tight seal. Positive lead 18 connects anode 16 to cap 24. A safety valve 28 is disposed in the inner side of cap 24 and is configured to decrease the pressure within battery 10 when the pressure exceeds some predetermined value. Electrochemical cell 10 can be, for example, a cylicdrical wound cell, a button or coin cell, a prismatic cell, a rigid laminar cell or a flexible pouch, envelope or bag cell.

Anode 12 can include alkali and alkaline earth metals, such as lithium, sodium, potassium, calcium, magnesium, or alloys thereof. The anode can include alloys of alkali or alkaline earth metals with another metal or other metals, for example, aluminum. An anode including lithium can include elemental lithium or lithium alloys, or combinations thereof.

The electrolyte solution includes a solvent and a salt. The salt can be an alkali or alkaline earth salt such as a lithium salt, a sodium salt, a potassium salt, a calcium salt, a magnesium salt, or combinations thererof. Examples of lithium salts include LiPF$_6$, LiBF$_4$, LiAsF$_6$, LiClO$_4$, LiI, LiBr, LiAlCl$_4$, LiCF$_3$SO$_3$LiN(CF$_3$SO$_2$)$_2$, Li(C$_4$F$_9$SO$_2$NCN), and LiB(C$_6$H$_4$O$_2$)$_2$. The solvent can be an organic solvent. Examples of organic solvents include cyclic carbonates, chain carbonates, ethers, esters, alkoxy alkanes, nitriles and phosphates. Examples of cyclic carbonates include ethylene carbonate and propylene carbonate. Examples of chain carbonates include dimethyl carbonate, diethyl carbonate and ethylmethyl carbonate. Examples of ethers include diethyl ether and dimethyl ether. Examples of esters include methyl propionate, ethyl propionate, methyl butyrate and gamma butyrolactone. Examples of alkoxy alkanes include dimethoxy ethane and diethoxy ethane. Examples of nitriles include acetonitrile. Examples of phosphates include triethyl phosphate and trimethyl phosphate. The electrolyte can be a polymeric electrolyte.

The concentration of the salt in the electrolyte solution can range from about 0.01 molar to about 3 molar, more preferably from about 0.5 molar to about 1.5 molar, and most preferably about 1 molar.

Separator 20 can be formed of any of the standard separator materials used in lithium primary or secondary batteries. For example, separator 20 can be formed of polypropylene, polyethylene, a polyamide (e.g., a nylon), a polysulfone and/or a polyvinyl chloride. Separator 20 can have a thickness of from about 0.1 millimeters to about 2 millimeters, and more preferably from about 0.2 millimeters to about 0.5 millimeters.

Separator 20 can be cut into pieces of a similar size as anode 12 and cathode 16 and placed therebetween as shown in FIG. 1. Anode 12, cathode 16 and separator 20 can then be placed within housing 22 which can be made of a metal such as nickel or nickel plated steel, stainless steel, aluminum-clad stainless steel, or a plastic such as polyvinyl chloride, polypropylene, a polysulfone, ABS or a polyamide. Housing 22 containing anode 12, cathode 16 and separator 20 can be filled with the electrolytic solution and subsequently hermetically sealed with cap 24 and annular insulating gasket 26.

Cathode 16 includes an active cathode material that can undergo alkali ion insertion during discharge of battery 10. The cathode can also include a binder, for example, a polymeric binder such as PTFE, PVDF or Viton. The cathode can also include a carbon source, such as, for example, carbon black, synthetic graphite including expanded graphite or non-synthetic graphite including natural graphite, an acetylenic mesophase carbon, coke, graphitized carbon nanofibers or a polyacetylenic semiconductor.

The active cathode material includes lambda-manganese dioxide (γ-MnO$_2$), which can be synthesized by an oxidative delithiation process from a stoichiometric lithium manganese oxide spinel (LiMn$_2$O$_4$) precursor prepared by various synthetic methods and having differing physical properties. A suitable lithium manganese oxide spinel can be prepared as described in, for example, U.S. Pat. Nos. 4,246,253; 4,507,371; 4,828,834; 5,245,932; 5,425,932, 5,997,839, or 6,207,129, each of which is incorporated by reference in its entirety. More particularly, the lithium manganese oxide spinel can have a formula of Li$_{1+x}$Mn$_{2-x}$O$_4$, where −0.02<x<+0.02. Alternatively, a suitable stoichiometric lithium manganese oxide spinel can be obtained, for example, from Kerr-McGee Chemical LLC, Oklahoma City, Okla., Carus Chemical Co., Peru, Ill., or Erachem-Comilog, Inc., Baltimore, Md.

Physical, microstructural, and chemical properties for commercial samples of LiMn$_2$O$_4$-type spinels obtained from three different suppliers are summarized in Table 1. The x-ray powder diffraction (XRD) patterns for the $LiMn_2O_4$-type spinel powders were measured using a Rigaku Miniflex diffractometer using Cu $K_\alpha$ radiation. The spinel powder from Carus Chemical has the largest refined cubic lattice cell constant, $a_o$, and also has a chemical composition very close to that for stoichiometric $LiMn_2O_4$ spinel. The reported (e.g., ICDD PDF No. 35-0782) cubic lattice constant for stoichiometric $LiMn_2O_4$ spinel is 8.248 Å. The other spinel powders from Kerr-McGee and Erachem (viz., Chemetals) have XRD powder patterns that give refined lattice constants of 8.231 Å and 8.236 Å, respectively. These latter $a_0$ values are more consistent with those values typically reported for spinels having a slight excess lithium stoichiometry (i.e., $Li_{1+x}Mn_{2-x}O_4$, where $0<x<0.1$). The $a_0$ values for such spinels decrease linearly as x increases for x values between −0.15 and 0.25. See, for example, U.S. Pat. No. 5,425,932, which is incorporated by reference in its entirety.

The oxidative delithiation process can include, for example, the following steps:
1. A slurry of the precursor spinel powder is formed with stirring in distilled or deionized water and adjusted to a temperature between about 10 and 50° C., preferably between about 15° C. and 30° C.;
2. An aqueous solution of an acid, such as, for example, sulfuric acid, nitric acid, hydrochloric acid, perchloric acid, toluenesulfonic acid or trifluoromethylsulfonic acid, is added to the slurry with constant stirring at a rate to maintain a constant slurry temperature until the pH of the slurry stabilizes at a value typically below about 2, below about 1, or below about 0.7 but greater than about 0.5, and remains constant at this value for at least 0.75 hour (optionally, stirring can be continued for up to an additional 24 hours);
3. The solid product is separated from the supernatant liquid, for example, by suction, pressure filtration, or centrifugation, and is washed with aliquots of distilled or deionized water until the washings have a neutral pH (e.g., between about 6–7); and
4. The solid product is dried in vacuo for between 4 and 24 hours at 30 to 120° C., preferably at 50 to 90° C., or more preferably at 60° C. to 70° C.

After processing, the dried solid typically exhibits a weight loss of about 27 wt % relative to the initial weight of the precursor $LiMn_2O_4$ spinel powder. The total lithium content of the stoichiometric $LiMn_2O_4$ spinel is about 3.8 wt %. The expected total weight loss is about 28 wt %. The observed weight loss can be attributed to dissolution of lithium ions that migrated to the surface of the spinel particles as well as $Mn^{+2}$ ions from the $LiMn_2O_4$ spinel crystal lattice putatively resulting from a disproportionation reaction whereby $Mn^{+3}$ ions on the surface of the spinel particles are converted to insoluble $Mn^{+4}$ ions that remain on the surface and soluble $Mn^{+2}$ ions that dissolve in the acid solution according to Equation 1:

$$2LiMn^{+3}Mn^{+4}O_4+4H^+ \rightarrow 3\gamma\text{-}Mn^{+4}O_2+Mn^{+2}+2Li^++2H_2O \quad (1)$$

Maintaining the temperature of the acid solution below about 55° C. during the delithiation process can minimize the formation of undesirable manganese oxide side-products that can form by re-oxidation by oxygen of the aqueous $Mn^{+2}$ ions. For example, the dissolution of $\gamma\text{-}MnO_2$ can proceed by a mechanism whereby $\gamma\text{-}MnO_2$ is reduced by water according to Equation 2. The resulting $Mn^{+3}$ ions formed on the surface of the $\gamma\text{-}MnO_2$ particles can disproportionate according to Equation 3 to form soluble $Mn^{+2}$ ions and insoluble $Mn^{+4}$. The soluble $Mn^{+2}$ ions can be reoxidized according to Equation 4 by air as well as by oxygen generated during the reduction of $\gamma\text{-}MnO_2$ to form undesirable manganese oxide products that can deposit on the surface of the remaining $\gamma\text{-}MnO_2$ particles (see, Equation 2–4).

$$2\gamma\text{-}Mn^{+4}O_2+H_2O \rightarrow 2Mn^{+3}OOH \text{ (surface)} + \frac{1}{2}O_2 \quad (2)$$

$$2Mn^{+3}OOH \text{ (surface)} \rightarrow \gamma\text{-}Mn^{+4}O_2+Mn^{+2}+2H^+ \quad (3)$$

$$Mn^{+2}+O_2 \rightarrow \text{mixtures of } \alpha\text{-}Mn^{+4}O_2, \gamma\text{-}Mn^{+4}O_2, \beta\text{-}Mn^{+4}O_2, \text{etc.} \quad (4)$$

Figure 2:
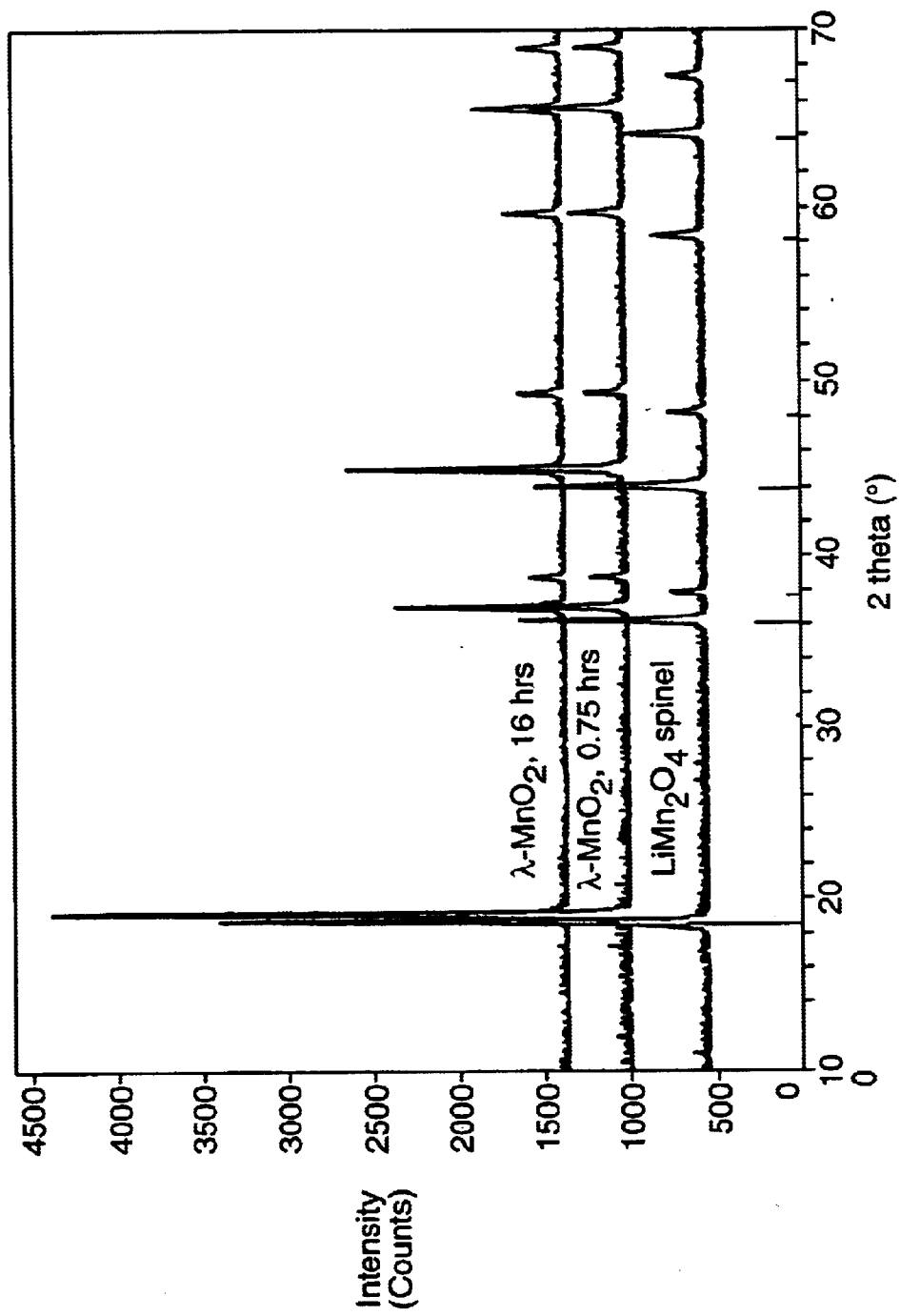
FIG. 2 is a graph depicting a comparison of x-ray powder diffraction patterns for γ-MnO$_2$ powders and the nominally stoichiometric spinel precursor powder.

The x-ray diffraction patterns for the $\gamma\text{-}MnO_2$ powders were measured using a Rigaku Miniflex diffractometer using Cu $K_\alpha$ radiation. The XRD powder patterns for the various dried $\gamma\text{-}MnO_2$ powders are consistent with that reported for $\gamma\text{-}MnO_2$ (e.g., ICDD PDF No. 44-0992). See, U.S. Pat. No. 4,246,253, which is incorporated by reference in its entirety. The lattice constants, $a_0$, for the refined cubic unit cells for the samples of $\gamma\text{-}MnO_2$ prepared by the method described above are given in Table 1. The $a_0$ values range between 8.035 and 8.048 Å. T. Ohzuku et al have reported (See J. Electrochem. Soc., Vol. 137, 1990, pp. 769) that the refined cubic lattice constant $a_0$, can be correlated with the residual lithium content in the $\gamma\text{-}MnO_2$ lattice (i.e., the smaller the $a_0$ value, the less lithium present). FIG. 2 is a graph depicting a comparison of x-ray powder diffraction patterns for $\gamma\text{-}MnO_2$ powders prepared by either 0.75 or 16 hours of acid treatment of a precursor spinel and the corresponding precursor spinel powder from Kerr-McGee having a nominal excess lithium stoichiometry of $Li_{1.05}Mn_{1.95}O_4$. The XRD powder pattern for $\gamma\text{-}MnO_2$ is distinguishable from that for the corresponding precursor spinel as shown in FIG. 2 for a sample of precursor spinel having a nominal excess lithium stoichiometry of $Li_{1.05}Mn_{1.95}O_4$ and the corresponding $\gamma\text{-}MnO_2$ acid-treated for either 0.75 or 16 hours at 15° C. by a shift in the diffraction peak positions to higher 2-theta angles for $\gamma\text{-}MnO_2$.

The precursor spinel can have a nominally stoichiometric composition, for example, a composition having the formula $Li_{1+x}Mn_{2-x}O_4$, wherein x is from −0.02 to +0.02, such as $Li_{1.01}Mn_{1.99}O_4$, from which more complete delithiation can be accomplished, and in general, replacement of the lithium ions with protons by an ion-exchange process, such as that shown in equation 5, can be reduced or avoided. The presence of protons in lattice sites formerly occupied by lithium ions is theorized by the present inventors to result in thermal instability and decreased discharge capacities for lithium cells having cathodes including such materials.

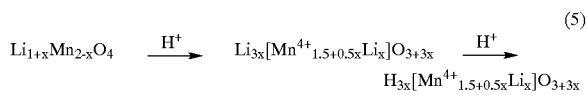
(5)

where $0.02<x<0.33$

Specific surface areas of the various $\gamma\text{-}MnO_2$ powders as determined by multipoint nitrogen adsorption isotherms by the B.E.T. method as described by P. W. Atkins in "Physical Chemistry", $5^{th}$ ed., New York: W. H. Freeman & Co., 1994, pp. 990–2. BET measurements were found to be substantially greater than those for the corresponding precursor spinel powders. See, Table 1. This increase in specific surface area is consistent with apparent increased roughness or porosity in the surface microstructure of the particles observed by comparing SEM micrographs (10,000×) of particles of the precursor spinel, for example, and particles of the corresponding γ-MnO$_2$. Further, porosimetric measurements on a precursor spinel powder and the corresponding γ-MnO$_2$ powder revealed that the total pore volume more than doubled after de-lithiation to γ-MnO$_2$ and that the average pore size decreased by nearly 80%.

TABLE 1

| Precursor Spinel | Spinel A | Spinel B | Spinel C |
|---|---|---|---|
| Lattice constant, a$_o$ Spinel (Å) | 8.231 | 8.242 | 8.236 |
| Lattice constant, a$_o$ λ-MnO$_2$ (Å) | 8.048 | 8.035 | 8.041 |
| BET SSA, Spinel (m$^2$/g) | 0.44 | 3.43 | 1.78 |
| BET SSA, λ-MnO$_2$(m$^2$/g) | 4.98 | 8.30 | 7.21 |
| Ave particle size, Spinel (μm) | 12 | 14.6 | 28.5 |
| Average Pore Size, Spinel (Å) |  | 157 |  |
| Average Pore Size, λ-MnO$_2$ (Å) |  | 36.5 |  |
| Total Pore Volume, Spinel (cc/g) |  | 0.05 |  |
| λ-MnO$_2$ Total Pore Volume (cc/g) |  | 0.11 |  |
| Tap Density, Spinel (g/cm$^3$) | 2.10 | 2.08 | 1.96 |
| Spinel Stoichiometry, Li$_{1+x}$Mn$_{2-x}$O$_4$, x = ? | 0.06–0.08 | 0.01 | >0.02 |
| True Density, Spinel (g/cm$^3$) | 4.225 | 4.196 | 4.219 |
| True Density, λ-MnO$_2$ (g/cm$^3$) | 4.480 | 4.442 | 4.611 |

In certain embodiments, precursor spinels that permit preparation of γ-MnO$_2$ in accordance with the present invention can be selected according to the following selection criteria: (1) general chemical formula is Li$_{1+x}$Mn$_{2-x}$O$_4$ wherein x ranges from −0.05 to +0.05, preferably from −0.02 to +0.02, more preferably from −0.005 to +0.005; (2) BET surface area of the precursor spinel powder is between about 1 and 10 m$^2$/g; (3) total pore volume of the precursor spinel powder is between about 0.02 and 0.1 cubic centimeters per gram; and (4) average pore size of the precursor spinel powder is between about 100 and 300 Å.

The thermal stability of the γ-MnO$_2$ powder prepared by the method of the invention was evaluated in order to determine the effects of various thermal treatments during cathode fabrication (e.g., drying, coating, pressing, etc.) on cell discharge performance. The XRD powder patterns for a sample of γ-MnO$_2$ powder heated in vacuo at 120° C. for 4 hours was found to be identical to that for a bulk sample of γ-MnO$_2$ powder originally dried in vacuo at 70° C. for up to 16 hours, indicating suitable thermal stability at this temperature. The XRD powder pattern for a sample of γ-MnO$_2$ powder heated in vacuo at 150° C. for 4 hours exhibited a slight broadening of the γ-MnO$_2$ peaks as well as the appearance of a new broad peak at a 2θ angle of about 20° indicating the onset of decomposition of the γ-MnO$_2$ phase. Heating a sample of γ-MnO$_2$ powder in vacuo at 180° C. for 4 hours resulted in the complete disappearance of the characteristic γ-MnO$_2$ peaks and the appearance of several broad peaks in the XRD pattern suggesting the formation of one or more new phases. These poorly-resolved new peaks can be attributed to the presence of a mixture of β-MnO$_2$ and ε-MnO$_2$ phases.

In addition to evaluating the thermal stability of the γ-MnO$_2$ powder, the thermal stability of γ-MnO$_2$ in pressed composite cathodes also containing a conductive carbon and a binder was evaluated. XRD patterns for pressed composite cathodes after heating for 4 hours at 120° C. showed a broadening of the γ-MnO$_2$ peaks as well as the appearance of several new, broad, weak peaks attributed to the δ-MnO$_2$ phase indicating the onset of decomposition of the γ-MnO$_2$ phase. Thus, γ-MnO$_2$ in the pressed composite cathode appears to start decomposing at an even lower temperature than γ-MnO$_2$ powder alone. In XRD patterns for cathodes heated at 150° C. or 180° C., all of the peaks attributed to the γ-MnO$_2$ phase disappeared completely, and only broad peaks characteristic of the ε-MnO$_2$ phase were present. Furthermore, unlike the case of γ-MnO$_2$ powder, no peaks for the β-MnO$_2$ phase could be discerned in the XRD pattern for a composite cathode heated at 180° C.

Lithium primary cells including composite cathodes containing γ-MnO$_2$ were prepared according to the following representative examples.

EXAMPLE 1

Approximately 120 g of a nearly stoichiometric spinel B having a nominal composition of Li$_{1.01}$Mn$_{1.99}$O$_4$ (Carus Chemical Co.) was added with stirring to about 200 ml distilled water to form an aqueous slurry that was cooled to 15° C. 6M H$_2$SO$_4$ was added dropwise with constant stirring until the pH of the slurry stabilized at about 0.7. The slurry was stirred for an additional 20 hours at pH 0.7. The rate of acid addition was adjusted so as to maintain the temperature of the slurry at 15° C. The solid was separated from the liquid by either pressure or suction filtration through a non-woven, spun-bonded polyethylene film (Dupont, Tyvek) and washed with aliquots of distilled water until the washings had a neutral pH (e.g., a pH of about 6). The solid filtercake was dried in vacuo for 4–16 hours at 70° C. The weight of the dried γ-MnO$_2$ product was about 87 g, which corresponds to a weight loss of about 27.5%.

Samples of dried ?-MnO$_2$ powder were mixed with carbon black (Chevron SAB/C55) as a conductive additive and PTFE powder (Dupont 601A) as a binder in a weight ratio of 60:10:30 in a laboratory blender to form a cathode mix. Portions (~0.5 g) of the cathode mix were pressed into composite cathode disks about 17.5 mm in diameter (i.e., ~2.5 cm$^2$ in area) and inserted into stainless steel test cells having an effective internal diameter of 17.5 mm thereby simulating a typical lithium coin cell. Such cells also have limited electrolyte volume, electrodes in close geometric proximity, and a positive pressure (e.g., 2 kg/cm$^2$) applied to the electrodes by a coil spring inside the cell. The design of the test cell is similar to that described by Geronov et al., in J. Electrochem. Soc., Vol. 137, No. 11, 1990, pp. 3338–3344, which is incorporated herein by reference in its entirety. A disk punched from lithium metal foil 1 mm thick served as the anode. The electrolyte solution was 1M LiPF$_6$ in 1:1, v/v EC:DMC (EM Industries, ZV1020) as typically used in secondary lithium-ion cells. A separator sheet in the form of a disk was saturated with electrolyte solution and placed on top of the cathode disk. Additional electrolyte was added to ensure complete wetting of the cathode disk.

Figure 3:
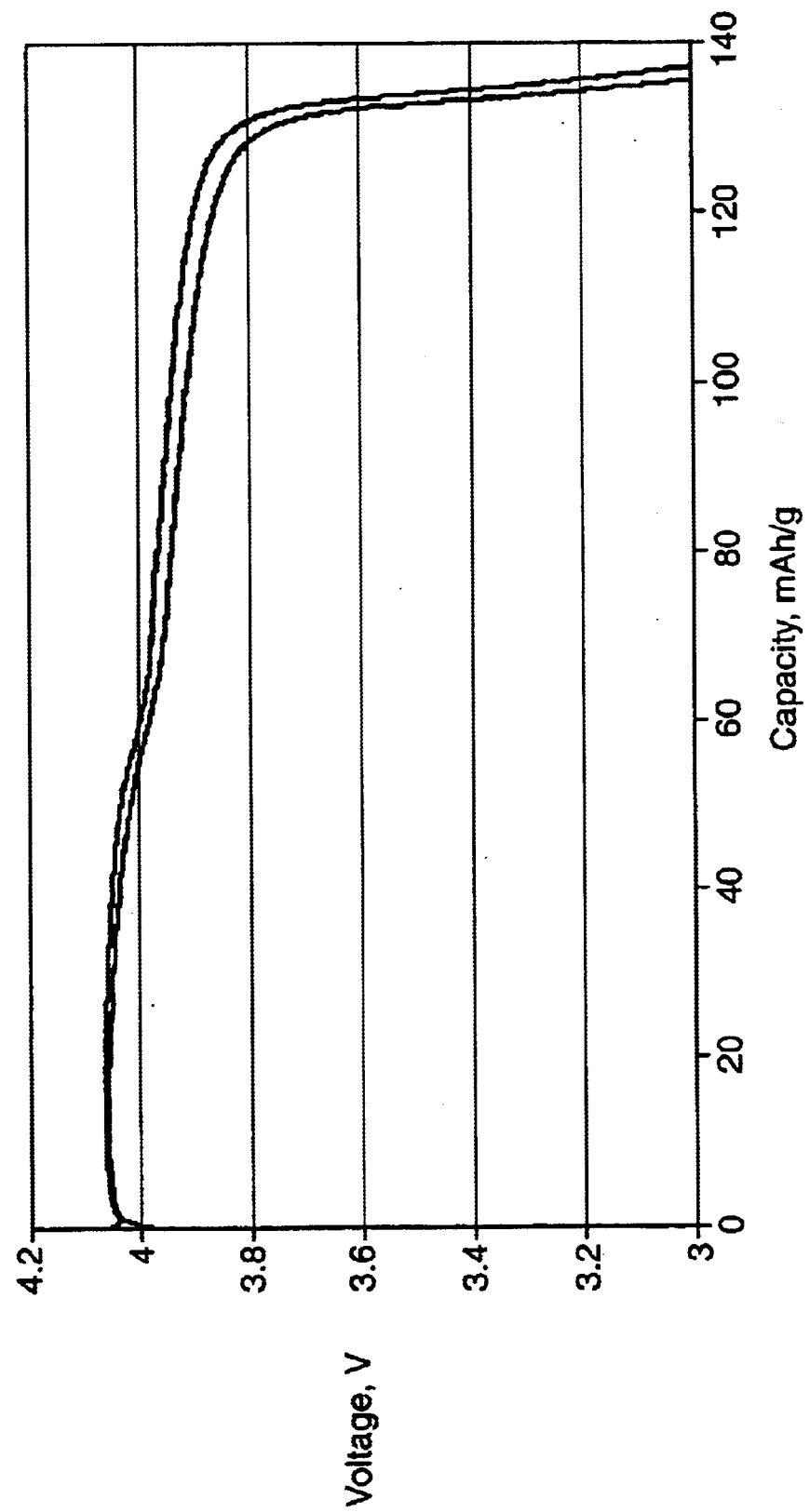
FIG. 3 is a graph depicting the discharge performance of primary lithium electrochemical cells discharged at 1 mA/cm$^2$ (i.e., C/45) to a 3V cutoff.

The spring-loaded cells of Example 1a with cathodes containing γ-MnO$_2$ prepared from the spinel B were discharged at a nominal constant current of 1 mA corresponding to a current density of 0.4 mA/cm$^2$ and a nominal discharge rate of about C/45. These cells were discharged to cutoff voltages of 3.5V or 3V. Gravimetric or specific (viz., mAh/g) discharge capacities for the cells of Example 1a of about 135 mAh/g to 3V and 133 mAh/g to 3.5V were obtained. See Table 2. Also, the discharge curve for the cells of Example 1 a exhibited two distinct, flat plateaus at about 4.05V and about 3.95V, as shown in FIG. 3.

Another cathode mix was prepared by mixing γ-MnO$_2$ dried at 70° C. for 4 hours with carbon black (viz., Chevron SAB/C55) as a conductive additive and of PTFE powder (e.g., DuPont 601A) as a binder in a weight ratio of 75:10:15 in a laboratory blender. Portions (~0.5 g) of the cathode mix were pressed into cathode disks that were inserted into several spring-loaded cells. The spring-loaded cells of Example 1b with cathodes containing γ-MnO$_2$ prepared from spinel B were discharged at a constant current of 2.5 mA, corresponding to a current density of 1 mA/cm² and a nominal discharge rate of C/25. The cells were discharged to cutoff voltages of 3.5V or 3V. Gravimetric discharge capacities of about 137 mAh/g to 3V and 134 mAh/g to 3.5V were obtained for the cells of Example 1b. See Table 2.

COMPARATIVE EXAMPLE 1

Figure 4:
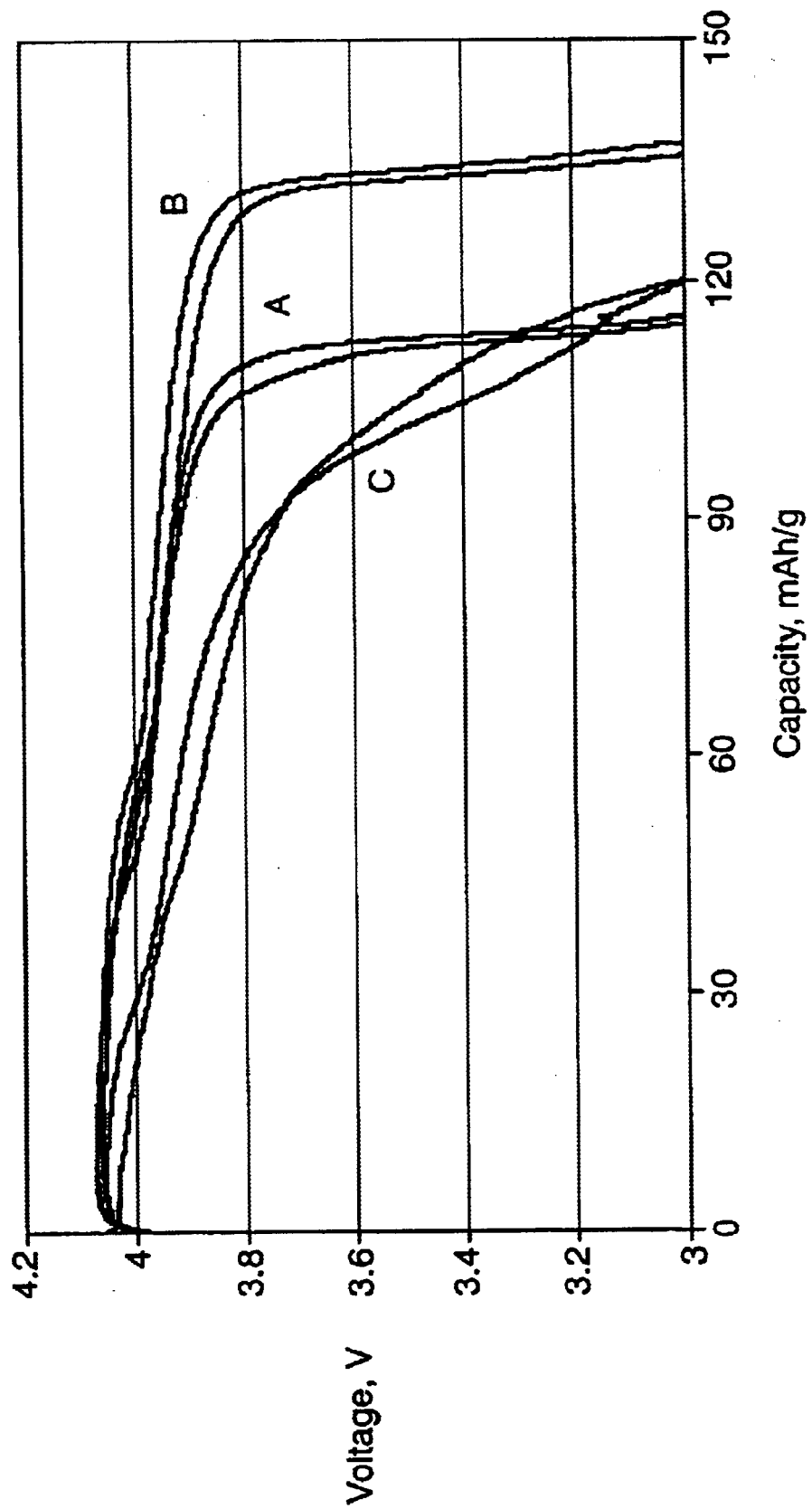
FIG. 4 is a graph depicting a comparison of the discharge performance of primary lithium electrochemical cells discharged at either 0.4 mA/cm$^2$ or 1 mA/cm$^2$ to a 3V cutoff.

Samples of γ-MnO₂ were prepared in the same manner as described in Example 1 except that spinel A having the nominal composition $Li_{1.06}Mn_{1.94}O_4$ (Kerr-McGee, #210) was employed. A cathode mix prepared by mixing γ-MnO₂ dried at 70° C. for 4 hours with carbon black (viz., Chevron SAB/C55) as a conductive additive and PTFE powder (viz., DuPont 601A) as a binder in a weight ratio of 60:10:30 in a laboratory blender. Portions (~0.5 g) of the mix were pressed into composite cathode disks that were inserted into several spring-loaded cells. The cells were discharged at a constant current of 1 mA to a cutoff voltage of 3V or 3.5V. The average open circuit voltage for freshly assembled cells was about 4.15V. Gravimetric discharge capacities of about 116 mAh/g to 3V and 113 mAh/g to 3.5V were obtained. See Table 2. Similar to the discharge curves for the cells of Example 1, the discharge curves for cells of Comparative Example 1 exhibited two distinct, flat plateaus at about 4.05V and about 3.95V as shown in FIG. 4.

COMPARATIVE EXAMPLE 2

Samples of γ-MnO₂ were prepared in the same manner as described in Example 1 except that spinel B having a nominally stoichiometric composition (Erachem/Chemetals, LMO-800E) was employed. A cathode mix prepared by mixing γ-MnO₂ dried at 70° C. for 4 hours with carbon black (viz., Chevron SAB/C55) as a conductive additive and PTFE powder (viz., DuPont 601A) as a binder in a weight ratio of 85:5:10 in a laboratory blender. Portions (~0.5 g) of the mix were pressed into composite cathode disks that were inserted into several spring-loaded cells. The cells were discharged at a constant current of 2.5 mA to a cutoff voltage of 3V or 3.5V. The average open circuit voltage for freshly assembled cells was about 4.17V. Gravimetric discharge capacities of about 120 mAh/g to 3V and 105 mAh/g to 3.5V were obtained. See Table 2. Unlike the discharge curves for the cells of Example 1, the discharge curves for the cells of Comparative Example 2 did not have two distinct, flat plateaus at about 4.05V and about 3.95V, but instead exhibited a sloping discharge profile as shown in FIG. 4.

EXAMPLE 2

Samples of γ-MnO₂ composite cathodes were prepared in the same manner as described in Example 1 except that they were heat-treated in vacuo at 120° C. for 4 hours (Ex. 2a) or 16 hours (Ex. 2b) or at 150° C. for 4 hours (Ex. 2c) before being inserted in lithium spring-loaded cells. These cells were discharged continuously at a constant current of 1 or 2.5 mA to a cutoff voltage of 3.5V and the resulting gravimetric discharge capacities given in Table 2. A comparison of the 4V plateau discharge capacities with those obtained for cells having γ-MnO₂ cathodes dried at 70° C. with no further heat-treatment clearly indicates that heat-treatment at 120° C. for 16 hours substantially degrades the 4V capacity. Heat-treatment at 150° C. for only 4 hours results in complete loss of 4V capacity. This loss of 4V capacity is dramatically depicted in FIG. 6.

Typical discharge curves for cells containing the γ-MnO₂ samples prepared from various commercial spinels are shown in FIG. 4. Lithium cells with composite cathodes containing γ-MnO₂ from spinel C discharged to a 3V cutoff at a nominal rate of about 1.0 mA/cm² gave specific capacities of about 120 mAh/g. Under similar discharge conditions, cells with composite cathodes containing γ-MnO₂ prepared from the spinel B gave a substantially greater specific capacity of about 135 mAh/g. Cells with composite cathodes containing γ-MnO₂ prepared from spinel A gave even lower specific capacities of about 115 mAh/g even at a substantially lower nominal discharge rate of about 0.4 mA/cm². Further, the discharge curves for cells containing γ-MnO₂ prepared from spinel A and spinel B both exhibit two distinct, relatively flat plateaus at about 4.05V and 3.95V similar to those typically observed for an electrochemically-charged spinel. In contrast, discharge curves for cells containing γ-MnO₂ prepared from spinel C exhibit a single sloping plateau in the 4V region with an average CCV of about 3.9V. Based on the discharge data for cells shown in FIG. 4, the γ-MnO₂ prepared from spinel B clearly provides superior low-rate discharge performance compared to γ-MnO₂ derived from either spinel A or spinel C.

TABLE 2

| Ex. No. | Spinel | Heat Treatment (° C./hours) | Discharge Rate (mA) | Ave OCV (V) | Capacity to 3.5 V (mAh/g) | Capacity to 3 V (mAh/g) |
|---|---|---|---|---|---|---|
| 1a | B | 70/4 | 1 | 4.18 | 133 | 135 |
| 1b | B | 70/4 | 2.5 | 4.14 | 134 | 137 |
| C1 | A | 70/4 | 1 | 4.15 | 113 | 116 |
| C2 | C | 70/4 | 2.5 | 4.17 | 105 | 120 |
| 2a | B | 120/4 | 1 | 4.16 | 125 | — |
| 2b | B | 120/16 | 2.5 | 4.14 | 106 | |
| 2c | B | 150/4 | 1 | 3.78 | 0.5 | |

Figure 5:
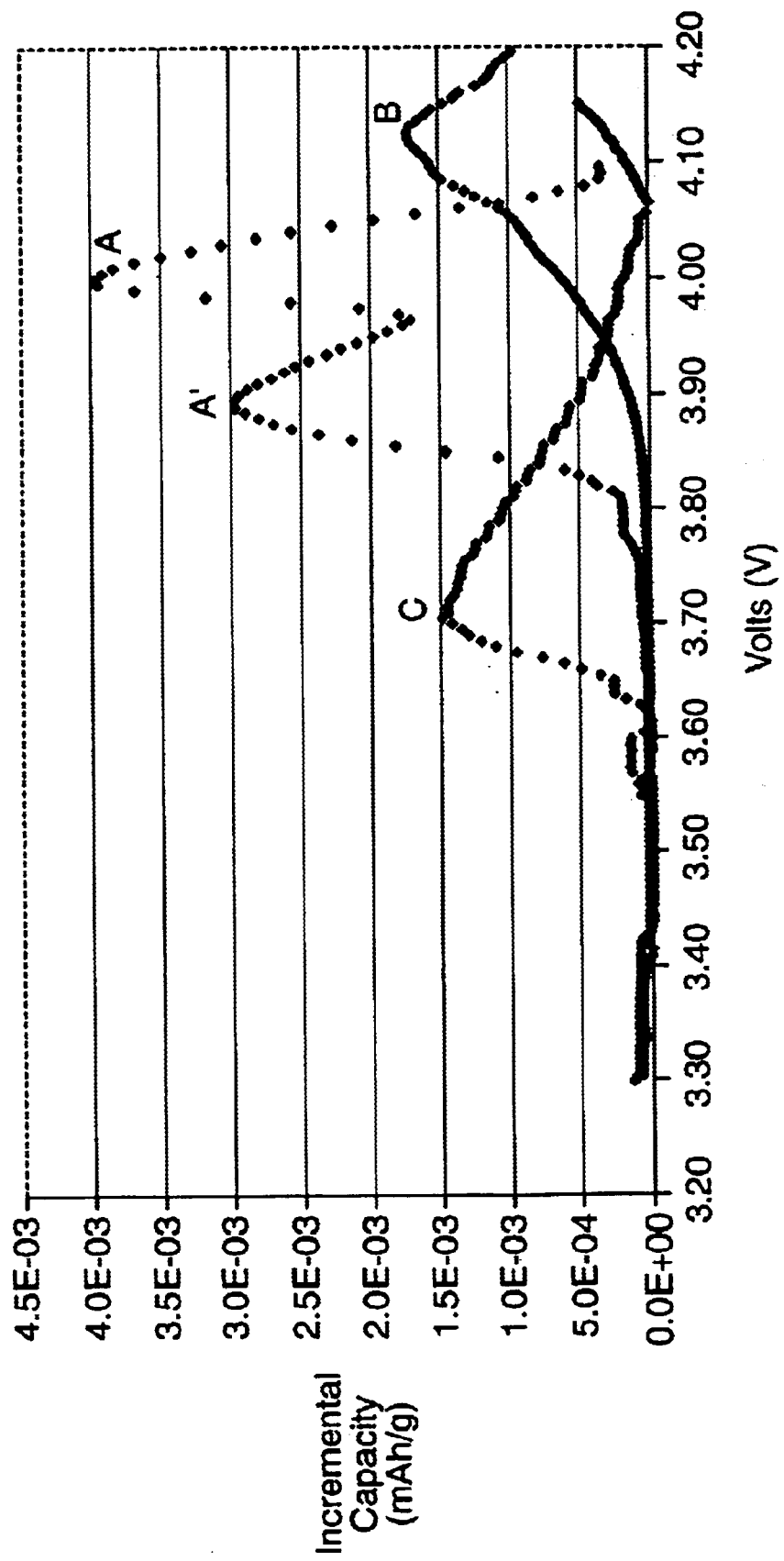
FIG. 5 is a graph depicting the incremental discharge capacity distribution for a primary lithium electrochemical cell having a cathode including γ-MnO$_2$ by Stepped Potential Electro-Chemical Spectroscopy (SPECS).

In addition, the incremental discharge capacity for a spring-loaded lithium cell having a cathode containing γ-MnO₂ of Example 1 was determined using the Stepped Potential Electro-Chemical Spectroscopy (SPECS) method described in detail by Bowden et al. in ITE Letters on Batteries, Vol. 1, No. 6, 2000, pp. 53–64, which is incorporated herein by reference in its entirety, and depicted in FIG. 5. The sharp peaks denoting the incremental capacity resulting from the initial discharge at a nominal sweep rate of 5 mV/hr of the γ-MnO₂ cathode material to a cutoff of 3.3V are centered at about 4.05V (peak A) and 3.9V (peak A') indicating the suitability of this material for use in a nominally 4V lithium cell. The relatively low incremental capacity of the broad peak at about 4.15V (peak B) obtained during recharge of the cell to a cutoff of 4.2V and the lack of any incremental capacity for the 4.05V and 3.9V peaks and the broad, low capacity peak centered at about 3.7V (peak C) during the second discharge of the cell to a 3.3V cutoff demonstrate the poor rechargeability of the γ-MnO₂ composite cathode. However, the γ-MnO₂ composite cathode is particularly suitable for use in primary lithium cells having a lithium metal anode. The inability to recharge a cell having a composite cathode containing γ-MnO₂ minimizes potential safety hazards related to re-depositing lithium metal at the anode during recharge and provides a substantial advantage for the 4V lithium primary cells compared to secondary lithium cells having lithium metal anodes.

Figure 6:
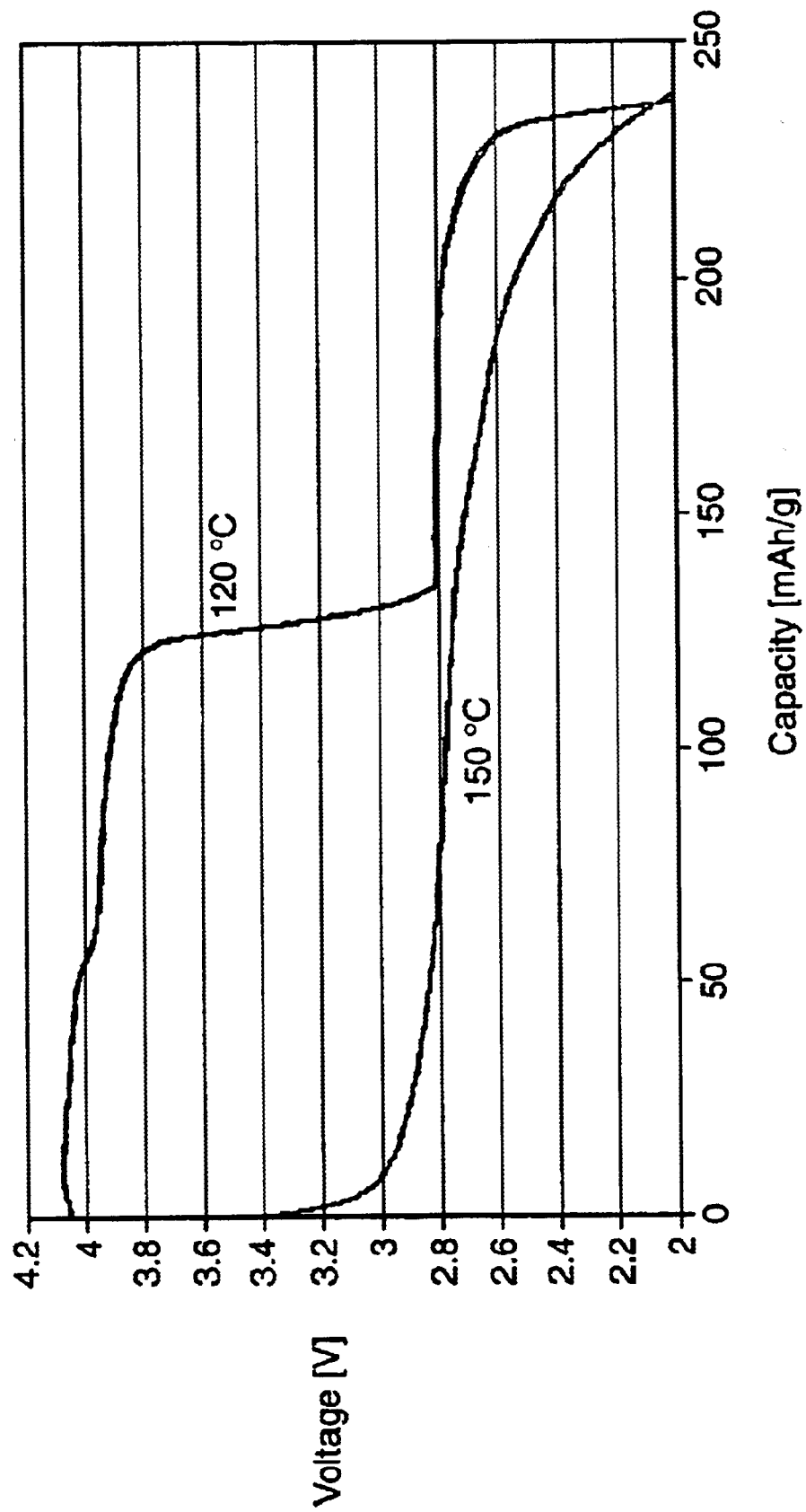
FIG. 6 is a graph depicting the discharge performance of primary lithium electrochemical cells having cathodes containing γ-MnO$_2$ heat-treated in vacuum at either 120° C. or 150° C. in vacuo for 4 hrs.

Discharge curves for spring-loaded cells containing γ-MnO₂ cathodes heat-treated at 120° C. and 150° C. are depicted in FIG. 6. The cells were discharged at a nominal rate of 0.4 mA/cm² to a 2.0V cutoff. The cells containing the γ-MnO₂ cathodes that were heat-treated at 120° C. gave a capacity of 125 mAh/g to a 3.5V cutoff, which is somewhat less than those cells containing non-heat-treated cathodes (e.g., 133 mAh/g). See Table 2. The lower capacity presumably is a consequence of some decomposition of the $\gamma$-$MnO_2$ phase during heat-treatment at 120° C. as evidenced in the XRD patterns. These cells gave a total capacity of about 235 mAh/g to 2V. The cells containing $\gamma$-$MnO_2$ cathodes heat-treated at 150° C., which actually contained predominantly $\epsilon$-$MnO_2$ phase based on the XRD pattern, had an OCV of ~3.7–3.8 V, a CCV of ~2.8 V, and also gave a total capacity of about 240 mAh/g to a 2V cutoff. Thus, it appears that all the capacity originally present on the 4 V plateau was shifted down to the 3 V plateau as a result of the heat treatment at 150° C. Therefore, it is necessary to keep processing temperatures below about 100° C. during drying, heat-treatment, and cathode fabrication and cell assembly processes in order to maintain the capacity on the 4V plateau.

A number of embodiments of the invention have been described. Nevertheless, it will be understood that various modifications may be made without departing from the spirit and scope of the invention. For example, oxidative delithiation of the precursor spinel can be performed using a variety of aqueous oxidizing agents including, for example, an aqueous solution of sodium or potassium peroxydisulfate, sodium or potassium peroxydiphosphate, sodium perborate, sodium or potassium chlorate, sodium or potassium permanganate, cerium (+4) ammonium sulfate or nitrate, or sodium perxenate, or ozone gas bubbled through acidic water. Non-aqueous oxidizing agents include, for example, nitrosonium or nitronium tetrafluoroborate in acetonitrile, nitrosonium or nitronium hexafluorophosphate in acetonitrile, or oleum (i.e., $SO_3/H_2SO_4$) in sulfolane. Using an aqueous chemical oxidant such as peroxydisulfate, ozone or a non-aqueous oxidizing agent to oxidize the $Mn^{+3}$ ions to $Mn^{+4}$ ions in the $LiMn_2O_4$ spinel can result in substantially less manganese being lost by dissolution than in the disproportionation process (Equation 1) taking place during treatment with an aqueous acid solution.

Other embodiments are within the scope of the following claims.

What is claimed is:

1. A primary lithium electrochemical cell comprising:
a cathode including lambda-manganese dioxide;
an anode including lithium;
a separator between the anode and the cathode; and
an electrolyte contacting the cathode, the anode and the separator,
wherein the cell has an average closed circuit voltage of about between about 3.8 and 4.1V and a specific discharge capacity to a 3V cutoff of greater than 130 mAh/g at a nominal discharge rate of 1 mA/cm$^2$.

2. The electrochemical cell of claim 1, wherein the cell has a 3V cutoff of greater than 135 mAh/g.

3. The electrochemical cell of claim 1, wherein the cell has a 3V cutoff of 140 mAh/g or greater.

4. The electrochemical cell of claim 1, wherein the lambda-manganese dioxide is maintained at a temperature of less than 150° C. during processing or cathode fabrication.

5. The electrochemical cell of claim 1, wherein the cathode containing the lambda-manganese dioxide is maintained at a temperature of 120° C. or less during processing or fabrication.

6. The electrochemical cell of claim 1, wherein the lambda-manganese dioxide has a BET surface area of greater than 4 m$^2$/g.

7. The electrochemical cell of claim 1, wherein the lambda-manganese dioxide has a BET surface area of greater than 8 m$^2$/g.

8. The electrochemical cell of claim 1, wherein the lambda-manganese dioxide has a total pore volume of from 0.05 to 0.15 cubic centimeters per gram.

9. A primary lithium electrochemical cell comprising:
a cathode including lambda-manganese dioxide having a total pore volume of greater than 0.11 cubic centimeters per gram, and the lambda-manganese dioxide has a BET surface area of greater than 8 m$^2$/g, wherein the lambda-manganese dioxide is maintained during processing at a temperature of 120° C. or less;
an anode including lithium or a lithium alloy;
a separator between the anode and the cathode; and
an electrolyte contacting the cathode, the anode and the separator,
wherein the cell has an average closed circuit voltage of about 4V, a specific discharge capacity to a 3V cutoff of greater than 130 mAh/g at a nominal discharge rate of 1 mA/cm$^2$.

10. The electrochemical cell of claim 9, wherein the cell has a 3V cutoff of 135 mAh/g or greater at a nominal discharge rate of 0.4 mA/cm$^2$.

* * * * *

UNITED STATES PATENT AND TRADEMARK OFFICE
CERTIFICATE OF CORRECTION

PATENT NO. : 6,759,167 B2
DATED : July 6, 2004
INVENTOR(S) : William L. Bowden et al.

It is certified that error appears in the above-identified patent and that said Letters Patent is hereby corrected as shown below:

Title page,
Item [57], ABSTRACT, replace "$\gamma$-$MnO_2$" with -- $\lambda$-$MnO_2$ --.

Column 1,
Lines 34 and 46, replace "$\gamma$-$MnO_2$" with -- $\lambda$-$MnO_2$ --.

Column 2,
Lines 43, 60 and 66, replace "$\gamma$-$MnO_2$" with -- $\lambda$-$MnO_2$ --.

Column 3,
Lines 2, 6, 7, 22 and 36, replace "$\gamma$-$MnO_2$" with -- $\lambda$-$MnO_2$ --.

Column 4,
Line 51, replace "$\gamma$-$MnO_2$" with -- $\lambda$-$MnO_2$ --.

Column 5,
Line 56, replace "$3\gamma$-Mn" with -- $3\lambda$Mn --.
Lines 63, 64 and 66, replace "$\gamma$-$MnO_2$" with -- $\lambda$-$MnO_2$ --.

Column 6,
Lines 3, 5, 8, 10, 16, 17, 20, 25, 28, 32, 36, 38 and 57, replace "$\gamma$-$MnO_2$" with -- $\lambda$-$MnO_2$ --.

Column 7,
Lines 1, 3, 4, 24, 34, 39, 41, 43, 45, 48, 50, 56 (both occurrences), 60, 62, 63, 65 and 67, replace "$\gamma$-$MnO_2$" with -- $\lambda$-$MnO_2$ --.
Line 61, replace "$\delta$-$MnO_2$" with -- $\varepsilon$-$MnO_2$ --.

Column 8,
Lines 2, 6, 24, 50, 60 and 67, replace "$\gamma$-$MnO_2$" with -- $\lambda$-$MnO_2$ --.
Line 26, replace "?-$MnO_2$" with -- $\lambda$-$MnO_2$ --.

Column 9,
Lines 9, 12, 29, 34, 51, 60 and 66, replace "$\gamma$-$MnO_2$" with -- $\lambda$-$MnO_2$ --.

UNITED STATES PATENT AND TRADEMARK OFFICE
CERTIFICATE OF CORRECTION

PATENT NO. : 6,759,167 B2
DATED : July 6, 2004
INVENTOR(S) : William L. Bowden et al.

It is certified that error appears in the above-identified patent and that said Letters Patent is hereby corrected as shown below:

Column 10,
Lines 2, 6, 8, 12, 16, 19, 21, 38, 45, 54, 55, 58, 64 and 67, replace "$\gamma$-$MnO_2$" with -- $\lambda$-$MnO_2$ --.

Column 11,
Lines 4 and 7, replace "$\gamma$-$MnO_2$" with -- $\lambda$-$MnO_2$ --.

Signed and Sealed this

Nineteenth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,759,167 B2
DATED : July 6, 2004
INVENTOR(S) : William L. Bowden et al.

It is certified that error appears in the above-identified patent and that said Letters Patent is hereby corrected as shown below:

Title page,
Item [56], References Cited, OTHER PUBLICATIONS, "Ammundsen et al.," reference, replace "Insertions" with -- Insertion --; "Bowden et al.," reference, replace "Tecnologies" with -- Technologies --; replace "Medicien" with -- Medicine --; replace "(200)" with -- (2000) --; "Hunter, J.C. and Tudron, F.B.," reference, replace "proc." with -- Proc. --; replace "manganese" with -- Manganese --; "Tarasson et al.," reference, replace "Tarason" with -- Tarascon --, both occurrences.

Signed and Sealed this

Twenty-first Day of June, 2005

JON W. DUDAS
*Director of the United States Patent and Trademark Office*